United States Patent
Finsterbusch et al.

(10) Patent No.: US 9,279,987 B2
(45) Date of Patent: Mar. 8, 2016

(54) OPTICAL ELEMENT AND LIGHTING DEVICE

(75) Inventors: Klaus Finsterbusch, Berlin (DE); Ulrich Hartwig, Berlin (DE)

(73) Assignee: OSRAM GmbH, Munich (DE)

( * ) Notice: Subject to any disclaimer, the term of this patent is extended or adjusted under 35 U.S.C. 154(b) by 16 days.

(21) Appl. No.: 14/001,302

(22) PCT Filed: Jan. 27, 2012

(86) PCT No.: PCT/EP2012/051332
§ 371 (c)(1),
(2), (4) Date: Aug. 23, 2013

(87) PCT Pub. No.: WO2012/113610
PCT Pub. Date: Aug. 30, 2012

(65) Prior Publication Data
US 2013/0329421 A1    Dec. 12, 2013

(30) Foreign Application Priority Data
Feb. 23, 2011   (DE) .......................... 10 2011 004 563

(51) Int. Cl.
*F21V 5/00*    (2015.01)
*G02B 27/14*   (2006.01)
*G02B 23/24*   (2006.01)
*G03B 21/20*   (2006.01)
*F21K 2/00*    (2006.01)

(52) U.S. Cl.
CPC .............. *G02B 27/141* (2013.01); *F21K 2/00* (2013.01); *G02B 23/2469* (2013.01); *G03B 21/204* (2013.01)

(58) Field of Classification Search
CPC .... G02B 27/141; G02B 23/2469; F21K 2/00; G03B 21/204
USPC .......... 362/231, 341, 327, 328, 335; 359/643, 359/618
See application file for complete search history.

(56) References Cited

U.S. PATENT DOCUMENTS

| | | | |
|---|---|---|---|
| 6,717,736 B1 * | 4/2004 | Hill ................................ | 359/629 |
| 7,625,102 B2 * | 12/2009 | Koike et al. .................... | 362/277 |
| 7,651,243 B2 * | 1/2010 | McGuire et al. ............... | 362/293 |
| 2006/0072215 A1 * | 4/2006 | Nishi ..................... | G02B 13/06 |
| | | | 359/708 |
| 2006/0227557 A1 * | 10/2006 | Li .................................. | 362/341 |
| 2007/0019408 A1 * | 1/2007 | McGuire et al. .............. | 362/231 |
| 2009/0284148 A1 | 11/2009 | Iwanaga | |
| 2010/0245776 A1 | 9/2010 | Yamamoto | |
| 2012/0206900 A1 * | 8/2012 | Yang et al. ....................... | 362/84 |

FOREIGN PATENT DOCUMENTS

| | | |
|---|---|---|
| EP | 1 605 199 | 12/2005 |
| WO | WO 2006/133214 | 12/2006 |

* cited by examiner

*Primary Examiner* — Anh Mai
*Assistant Examiner* — Glenn Zimmerman
(74) *Attorney, Agent, or Firm* — Cozen O'Connor

(57) ABSTRACT

A reflector/imaging optical element (11; 43) which is configured in order to transmit light (P1) of at least one first wavelength, concentrate light (P1) shone through the reflector/imaging optical element (11; 43) onto a first focal point (F) and reflect light (R) of at least one second wavelength, shone from the first focal point (F) onto the reflector/imaging optical element (11; 43), onto a second focal point (F') of the reflector/imaging optical element (11; 43).

13 Claims, 4 Drawing Sheets

OPTICAL ELEMENT AND LIGHTING DEVICE

RELATED APPLICATIONS

This is a U.S. national stage of International application No. PCT/EP2012/051332 filed on Jan. 27, 2012.

This application claims the priority of German application no. 10 2011 004 563.5 filed Feb. 23, 2011, the entire content of which is hereby incorporated by reference.

FIELD OF THE INVENTION

The invention relates to an optical element which is configured in order to concentrate light shone through it onto a first focal point. The invention furthermore relates to a lighting device having such an optical element.

BACKGROUND OF THE INVENTION

Image projectors in which light of a plurality of laser diodes of the same type is concentrated by means of a lens system onto a color wheel, or phosphor wheel, are known. The color wheel typically comprises a luminescent material region which wavelength-converts the primary laser light incident on it. The converted light is then collected by means of a lens system and, with the aid of dichroic mirrors, superimposed optionally with light of a different color, and finally concentrated onto a light mixer. Owing to the size of the components required and the large number of components, efficiency is relatively low.

SUMMARY OF THE INVENTION

It is one object of the present invention to provide a particularly compact and simple way of generating wavelength-converted light in an efficient way.

This object is achieved according to the features of the independent claims. Preferred embodiments may be found, in particular, in the dependent claims.

This and other objects are attained in accordance with one aspect of the present invention directed to a reflector/imaging optical element which is configured in order to transmit light of at least one first wavelength (primary light), concentrate or focus primary light shone through the reflector/imaging optical element onto a first focal point and reflect light of at least one second wavelength, shone (back) ("emission light") from the first focal point onto the reflector/imaging optical element, onto a second focal point of the reflector/imaging optical element. Owing to the double function of beam shaping and reflection, it is possible to save on components and a compact design is achieved. Furthermore, an efficient luminous yield, or a high efficiency, is made possible.

The reflector/imaging optical element may, in particular, be understood as an optical element which is used simultaneously as an imaging optical unit and as a reflector. More precisely, the reflector/imaging optical element is used as an imaging optical unit for the primary light of the at least one first wavelength passing through it and (in the opposite direction) as a reflector for the emission light of the at least one second wavelength. The at least one first wavelength and the at least one second wavelength are consequently different.

This reflector/imaging optical element is suitable in particular for use with lighting devices that comprise a luminescent material region which converts incident primary light at least partially into emission light of at least one second wavelength ("wavelength-converted fraction of the emission light"). In the case of often occurring incomplete conversion, a fraction of the incident primary light is scattered back from the luminescent material region without wavelength conversion ("primary light fraction of the emission light"). If the primary light illuminates such a luminescent material region through the reflector/imaging optical element, in particular if the luminescent material region lies at or in the vicinity of the first focal point, the back-scattered wavelength-converted fraction of the emission light can be reflected at least partially onto the second focal point by reflection on the reflector/imaging optical element. Conversely, the primary light fraction of the emission light (which is not wavelength-converted) scattered back by the luminescent material region into the reflector/imagining optical element passes through the reflector/imaging optical element again and may, for example, be lost. Essentially pure wavelength-converted light can thus be provided at the second focal point.

It is one configuration that the reflector/imaging optical element comprises a light-transmissive base body, which is formed as a converging lens. Thus, the primary light passing through the base body can be focused or concentrated onto the first focal point in a compact and precise way. The base body may consist of glass or plastic. The base body may be configured in one piece or a plurality of pieces. The (one-piece or multi-piece) base body may, in particular, be composed of sub-bodies or subregions having different properties, for example different refractive index and/or dispersion properties.

It is one refinement that the reflector/imaging optical element, in particular the base body thereof, in particular the outer side thereof, is shaped in such a way that the primary light for concentration onto the first focal point is preferably incident at a predetermined angle with respect to the outer side, including orthonormally. The reflector/imaging optical element, in particular the base body thereof, in particular the outer side thereof, may furthermore be adapted to incidence and concentration of primary light of different wavelengths, for example by the provision of different and, in particular, also differently shaped sectors or regions which are intended to be illuminated with a respective wavelength.

The reflector/imaging optical element, in particular the base body thereof, may in particular be configured essentially mirror-symmetrically with respect to a symmetry plane or symmetry axis and/or essentially rotationally symmetrically with respect to the symmetry axis of the reflector/imaging optical element. In the mirror-symmetrical configuration, the symmetry plane may in particular extend perpendicularly and centrally with respect to connecting line between the two focal points. For example, a basic shape which is round or oval in plan view may be used.

It is a special configuration that the base body has a concavo-convex basic shape. In this case, the base body may in particular have a convexly shaped outer side, which the primary light emitted by a first light source strikes first. The inner side is shaped concavely curved in the same direction. The inner side has in particular an ellipsoidal shape. Alternatively, the inner side may have a shape which corresponds to a combination of two paraboloid surfaces. The inner side constitutes, in particular, a reflector formed in a half-space. Alternatively, the outer side may be in the form of a Fresnel lens and may, for example, have annular regions, so that an installation height can be reduced.

It is another configuration that the reflector/imaging optical element comprises at least one dichroic reflector, in particular dichroic reflection layer, which is transmissive for the primary light and reflective at least for the wavelength-converted fraction of the emission light. Pure-color wavelength-converted light of the at least one second wavelength can thus be provided in a simple way at the second focal point, since the primary light fraction of the emission light which is shone back into the reflector/imaging optical element and thus onto the dichroic reflector passes through the reflector/imaging optical element again and typically is not used further. The dichroic reflector may, in particular, be transmissive for light of a wavelength of about 450 nm or less, and reflective for light of a wavelength of about 460 nm or more.

It is one refinement that the dichroic reflection layer is applied onto the inner side of the base body, in particular covering the inner side over essentially its full surface.

It is one refinement that the reflector/imaging optical element is configured to be partially dichroically reflective and partially wavelength-independently reflective. In this case, a dichroically reflective region may lie in particular on at least one surface, in particular of the inner side, which is provided for passage of the primary light from outside. The wavelength-independently reflective region may in particular lie on a surface complementary therewith, in particular of the inner side. Thus, part of the incident primary light can be reflected in a controlled way onto the second focal point and output from there as useful light.

The object is also achieved by a lighting device having at least one reflector/imaging optical element as described above.

It is one configuration that the lighting device furthermore comprises at least one first light source directed onto the reflector/imaging optical element (in particular the outer side thereof), which generates the primary light of the at least one first wavelength, and at least one luminescent material region lying least partially at or in the vicinity of the first focal point, the luminescent material region wavelength-converting the primary light at least partially. Thus, in particular pure wavelength-converted useful light of the at least one second wavelength can be provided in a particularly simple and compact way at the second focal point.

It is one refinement that at least one optical unit or optical element (for example an optical filter, imaging optical unit, etc.) is arranged between the at least one first light source and the reflector/imaging optical element. The primary light may be shone onto the reflector/imaging optical element in any suitable shape and direction. Primary light of different wavelengths may have a different shape, intensity and/or angle of incidence.

It is another configuration that at least one optical unit is arranged downstream of at least the second focal point. Thus, at least one property of the useful light beam output from the lighting device can be modified in a simple way, for example a width, an aperture angle, a color composition, a degree of homogenization, etc.

It is one refinement that the at least one optical unit arranged downstream of the second focal point comprises an imaging optical unit, a rectifying optical unit, a homogenizing optical unit, a filtering optical unit and/or a transparently or translucently light-transmissive optical unit.

It is furthermore a configuration that the luminescent material region is stationary relative to the first focal point. This permits a particularly compact, simple and economical structure. For example, the luminescent material region may have a luminescent material layer comprising at least one luminescent material, which is arranged at or in the vicinity of the first focal point.

It is an alternative configuration that the at least one luminescent material region is arranged on a rotatable lighting wheel. In particular, this permits sequential generation of light of different second wavelengths by positioning, dependent on the rotational setting of the lighting wheel, of a respective one of a plurality of luminescent material regions (which respectively comprise only one luminescent material or particular luminescent material mixture) at or in the vicinity of the first focal point. The use of a lighting wheel has the general advantage that it is possible to reduce thermal stress of the at least one luminescent material region due to Stokes losses during the wavelength conversion, which reduces thermally generated shifts of a wavelength of wavelength-converted light as well as a degree of "thermal quenching", and prevents thermally induced degradation of the luminescent material. This permits short- and long-term stable lighting properties.

It is also a configuration that the lighting wheel comprises at least a part of the optical unit arranged downstream of the second focal point. This advantageously permits selection of the optical unit arranged downstream, depending on the rotational setting of the lighting wheel, specifically in conjunction with a functional region, present at or in the vicinity of the first focal point, of the lighting wheel. In a predetermined rotational setting of the lighting wheel, the optical unit arranged downstream of the second focal point lies in particular at or in the vicinity of the second focal point. In particular, for the case in which the reflector/imaging optical element is also partially reflective for the primary light fraction of the emission light, the following pairings can thus be combined: first, a luminescent material region, used as a functional region, at or in the vicinity of the first focal point and an optical filter, non-transmissive for the primary light fraction of the emission light, as the optical unit at or in the vicinity of the second focal point. This permits output of pure emission light, wavelength-converted by the luminescent material region, as useful light. Secondly, a (functional) region reflecting at least the primary light, at or in the vicinity of the first focal point, and an in particular transparent region, light-transmissive for the primary light fraction of the emission light (which is in this case 100%), at or in the vicinity of the second focal point.

This permits low-loss output of the primary light component.

It is furthermore a configuration that the lighting wheel comprises a region which is transmissive for the primary light, which can in particular also (as a function of the rotational setting of the lighting wheel) be positioned at or in the vicinity of the first focal point. Thus, the primary light can be output even without further reflection on the reflector/imaging optical element.

It is another configuration that at least one optical unit is arranged downstream of the first focal point, in particular with direct output of light at the first focal point. This light can thus be influenced suitably, for example beam-shaped, filtered, etc.

It is furthermore a configuration that the lighting device comprises at least one second light source, which emits light of at least one third wavelength ("second primary light"). The at least one third wavelength differs from the at least one first wavelength and from the at least one second wavelength. The at least one third wavelength preferably comprises a wavelength assigned to red light, so that the heating of the lighting device due to Stokes losses, during wavelength conversion which is otherwise to be carried out, can be reduced. The at least one third wavelength is not, however, restricted thereto and may, for example, comprise blue light and/or infrared light, etc.

It is one refinement that the at least one second light source illuminates the lighting wheel from a side facing away from the reflector/imaging optical element, the reflector/imaging optical element reflecting the light of the at least one third wavelength, and, in a particular rotational setting of the lighting wheel, the second light source shining on a region, of the lighting wheel, which is transmissive for the second primary light. Thus, the light of the third wavelength can also be sequentially output at the second focal point. This is advantageous in particular if the second primary light is not obtained, or is obtained only elaborately, from wavelength conversion. The region transmissive for the second primary light is in particular one which is formed so as to scatter in the forward direction of the light passing through it, so that it can provide beam expansion. The at least one second light source may, in particular, be oriented in the direction of the first focal point.

The at least one (first and/or second) light source is in particular a monochromatic or quasi-monochromatic light source having a small bandwidth, in particular a laser-like light source, for example a laser or laser diode.

At least one (first and/or second) light source which comprises one or more lasers or laser light sources is preferred. A lighting device configured in such a way may also be referred to as a LARP ("Laser Activated Remote Phosphor") device. The at least one laser light source may in particular comprise at least one semiconductor laser, in particular a diode laser or laser diode. This may be configured in a particularly compact and robust manner. Laser diodes may also be operated simply together in groups, for example as a stack ("laser stack").

Alternatively, at least one (first and/or second) light source may for example comprise one or more light-emitting diodes. The at least one light-emitting diode may be provided in the form of at least one individually packaged laser diode or in the form of at least one LED chip. A plurality of LED chips may be mounted on a common substrate ("submount"). The at least one light-emitting diode may be equipped with at least one optical unit of its own and/or common optical unit for beam guiding, for example at least one Fresnel lens, collimator, or the like. Instead of or in addition to inorganic light-emitting diodes, for example based on InGaN or AlInGaP, organic LEDs (OLEDs, for example polymer OLEDs) are also generally usable.

The at least one light source may furthermore comprise at least one broadband light source, downstream of which at least one optical filter may be arranged.

Light of a particular wavelength may, in particular, be understood as light having a particular peak wavelength and/or having at least one particular spectral bandwidth. Light of a particular wavelength may, in particular, also be understood as light of a particular color.

It is also a configuration that the light of the at least one first light source comprises or is blue light and/or ultraviolet light, particularly in a wavelength range of equal to or less than 450 nm, in particular about 445 nm. Thus, useful light can be simply provided over essentially the entire visible light spectrum, and specifically by wavelength conversion to longer wavelengths ("down conversion"), for example from blue or UV to blue, green, yellow, red, infrared, etc.

It is also a refinement that the (first) primary light has a peak wavelength of about 445 nm (blue light) and a plurality of luminescent material regions convert the light of the first wavelength into blue (460 nm-470 nm), green, yellow, red and/or infrared light.

It is another (alternative or additional) refinement that the second primary light is blue light having a peak wavelength in a range of between about 460 nm and 470 nm.

It is another (alternative or additional) refinement that the second primary light is red light.

The lighting device may in particular be a projector, in particular an image projector, or a part thereof. However, the lighting device may for example also be a fiber-optic illumination apparatus, for example for use in the field of technical and medical endoscopy.

BRIEF DESCRIPTION OF THE DRAWINGS

The invention will be schematically described in more detail in the following figures with the aid of exemplary embodiments. In these, elements which are the same or have the same effect are provided with the same references for clarity.

DETAILED DESCRIPTION OF THE DRAWINGS

Figure 1:
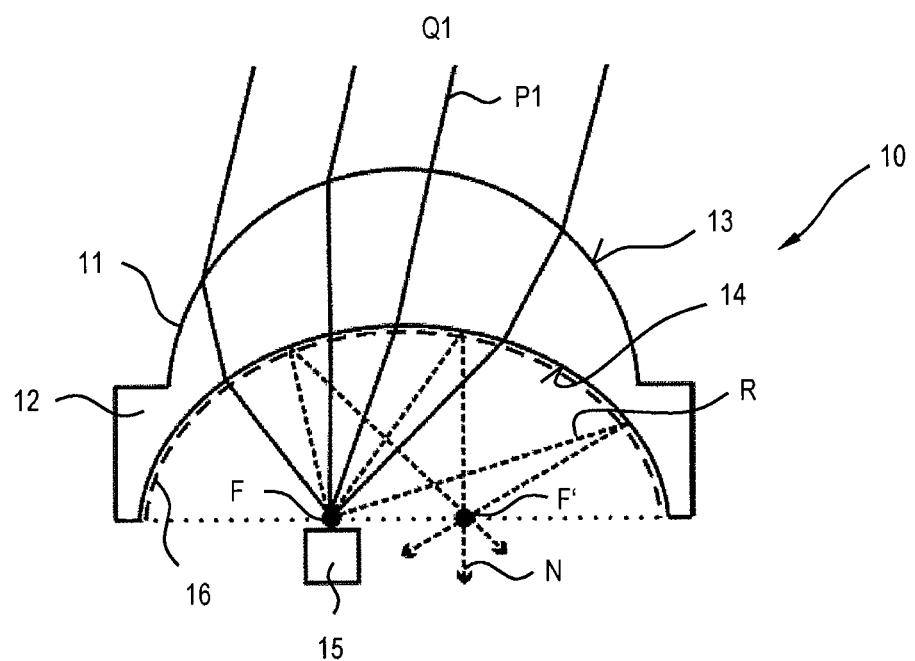
FIG. 1 shows a lighting device according to a first embodiment as a sectional representation in side view.

FIG. 1 shows a lighting device 10 according to a first embodiment as a sectional representation in side view. The lighting device 10 comprises a reflector/imaging optical element 11, which is configured in order to concentrate (first) primary light P1 of at least one first wavelength, shone through the reflector/imaging optical element 11, onto an associated first focal point F and to reflect light ("emission light") R of at least one second wavelength, shone from the first focal point F onto the reflector/imaging optical element 11, onto a second focal point F' of the reflector/imaging optical element 11.

To this end, the reflector/imaging optical element 11, formed in the half-space and mirror-symmetrical with respect to a symmetry axis or a symmetry plane S, comprises a light-transmissive base body 12, which is formed as a converging lens. The base body 12 has a concavo-convex basic shape with a (in plan view from above) convex outer side 13 and an (in plan view from below) ellipsoidally concave inner side 14. If the primary light P1 is first shone onto the outer side 13, it consequently passes through the base body 12 and then emerges on the inner side 14 and the primary light P1 is thus concentrated or focused onto the first focal point F. The primary light P1 may come from a first light source Q1 (not represented), for example from at least one laser light source or at least one light-emitting diode, which is directed onto the outer side 13. The primary light P1 is in this case shone obliquely onto the outer side 13.

At or in the vicinity of the first focal point F, there is in a stationary manner a luminescent material region 15 which at least partially converts the primary light P1 into light of the at least one second wavelength and returns it scattered in the direction of the reflector/imaging optical element 11, or more precisely onto its inner side 14 ("wavelength-converted fraction of the emission light R"). Furthermore, a non-wavelength-converted fraction of the primary light P1 is also scattered in the direction of the reflector/imaging optical element 11 ("primary light fraction of the emission light R").

On its inner side 14, the reflector/imaging optical element 11 furthermore comprises a dichroic reflection layer 16 having an ellipsoidal basic shape. The dichroic reflection layer 16 acts as a dichroic reflector which is transmissive for the primary light P1 of the first wavelength and (in particular specularly) reflective for the light R of the second wavelength. Consequently, the wavelength-converted fraction of the emission light R of the second wavelength striking the dichroic reflection layer 16 is reflected onto the second focal point F'. The primary light fraction of the emission light R returned by the luminescent material region 15 into the reflector/imaging optical element 11, on the other hand, passes through the dichroic reflection layer 16 and is lost. At the second focal point F', there is therefore at least essentially pure wavelength-converted light R, which can be output as useful light N.

The luminescent material region 15 may comprise one or more luminescent materials, and therefore emit a wavelength-converted fraction of the emission light R with one or more second wavelengths.

The at least one first wavelength of the primary light P1 may, in particular, be a peak wavelength of less than or equal to about 450 nm, for example blue light with a peak wavelength of about 445 nm, (far) blue light with a peak wavelength of about 400 nm or ultraviolet light. The at least one second wavelength of the wavelength-converted fraction of the emission light R may, in particular, comprise a peak wavelength of greater than or equal to about 460 nm, for example blue light with a peak wavelength of between 460 and 470 nm, mint-green light, green light, yellow light and/or red light. The dichroic reflection layer 16 may therefore, in particular, transmit light with a wavelength of 450 nm or less and reflect light with a wavelength of 460 nm or more.

Figure 2:
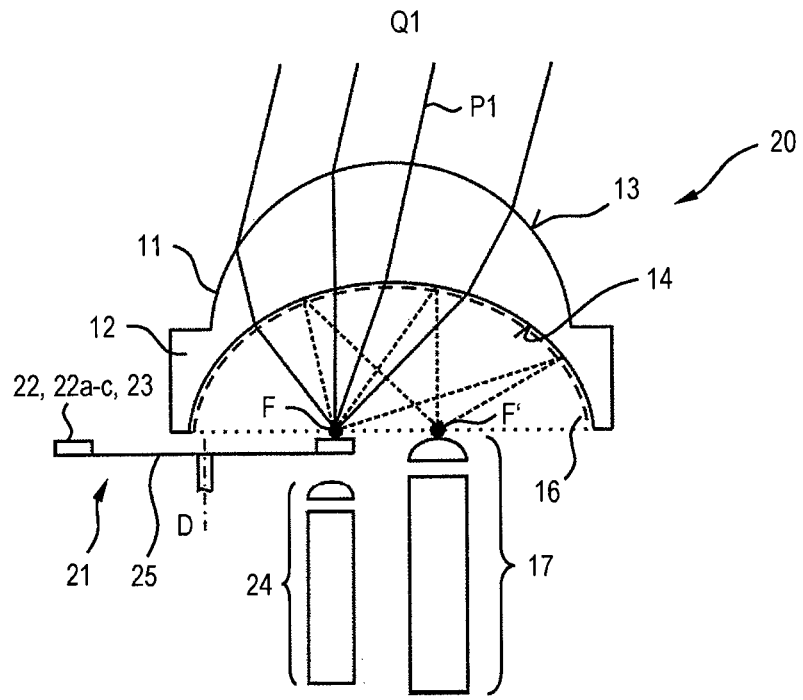
FIG. 2 shows a lighting device according to a second embodiment as a sectional representation in side view.

FIG. 2 shows a lighting device 20 according to a second embodiment as a sectional representation in side view. The lighting device 20 comprises a lighting wheel 21, on which at least one luminescent material region 22 is arranged. The lighting wheel 21 can be rotated about a rotation axis D, so that, depending on an angular setting or rotational setting of the lighting wheel 21, the at least one luminescent region 22 lies at or in the vicinity of the first focal point F (first rotational setting) or not (second rotational setting). During rotation of the lighting wheel 21, the at least one luminescent material region 22 is therefore periodically (at least with the same rotational speed) guided past the first focal point F and can then be illuminated with the primary light P1. The luminescent material region 22 may, in particular, be in the form of at least one luminescent material layer in the shape of a sector of a ring, applied on a carrier 25 of the lighting wheel 21.

Figure 3:
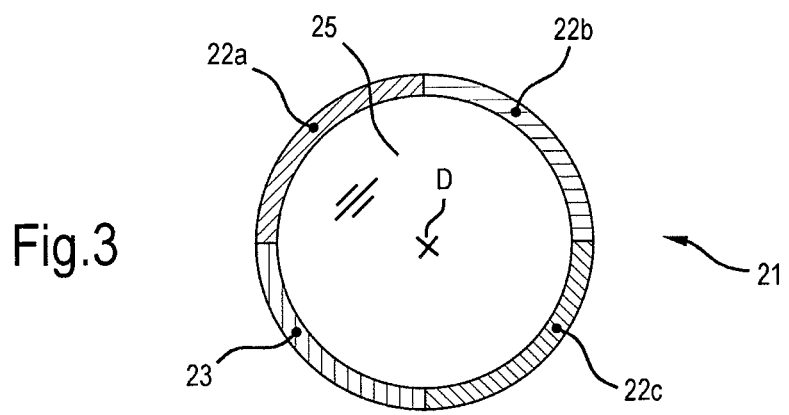
FIG. 3 shows a lighting wheel of the lighting device according to the second embodiment in plan view.

Instead of a single luminescent material region 22, there may also, as represented in plan view in FIG. 3, be a plurality of, here: three luminescent material regions 22a, 22b, 22c on the lighting wheel 21, which lie at or in the vicinity of the first focal point F in different rotational settings of the lighting wheel 21. These luminescent regions 22a, 22b, 22c comprise different luminescent materials and therefore generate different second wavelengths. Correspondingly, the dichroic reflection layer 16 may, in particular, be formed so that it is reflective for all luminescent material regions 22a, 22b, 22c, or their associated second wavelengths, or a suitable layer stack of a plurality of dichroic reflection layers may be used. During rotation of the lighting wheel 21, light of the different second wavelengths of the luminescent regions 22a, 22b, 22c is therefore alternately generated at the second focal point F'. With a sufficient rotational speed of the lighting wheel 21, these sequentially generated light beams are perceived by a human observer as mixed light, which has corresponding wavelength components or color components.

For improved output of the emission light R at the second focal point F', an optical unit 17, into which the light R reflected into the second focal point F' travels, is arranged downstream thereof.

In addition to the one luminescent region 22 or the plurality of luminescent regions 22a, 22b, 22c, the lighting wheel 21 may also comprises a region 23 which is transmissive for the primary light P1. In this way, in the second rotational setting, the (first) primary light P1 can be output as useful light N at the first focal point F, in particular in order to span a large adjustable 'gamut'. For improved output of the primary light P1 at the first focal point F, an optical unit 24, into which the primary light P1 concentrated onto the first focal point F travels, is arranged downstream thereof.

For provision of useful light N with components of the primary light P1 and emission light R respectively provided at the first focal point F and the second focal point F', a combiner (not shown), which combines the light beams of the optical units 17 and 24, may be arranged downstream of the optical units 17 and 24.

Figure 6:
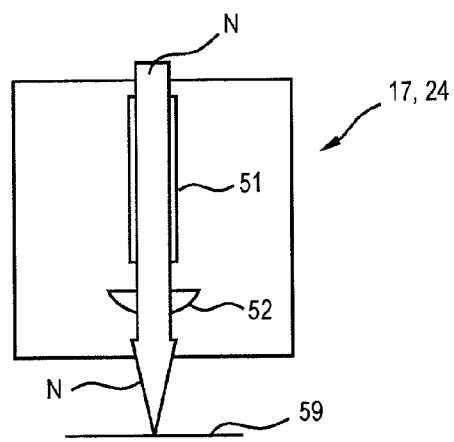
FIG. 6 shows a configuration of an optical unit for one of the lighting devices according to one of the first to fourth embodiments as a sectional representation in side view.
Figure 7:
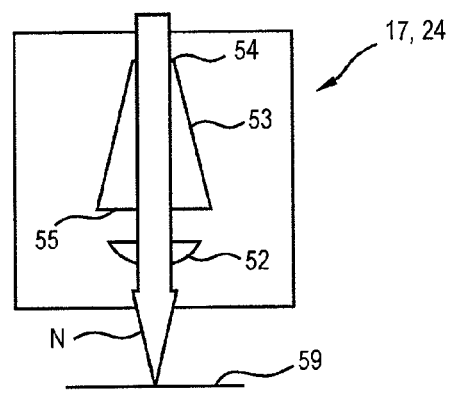
FIG. 7 shows another configuration of an optical unit for one of the lighting devices according to one of the first to fourth embodiments as a sectional representation in side view.
Figure 8:
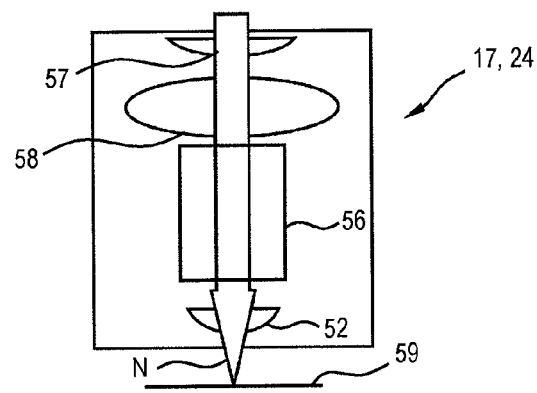
FIG. 8 shows yet another configuration of an optical unit for one of the lighting devices according to one of the first to fourth embodiments as a sectional representation in side view.

The optical units 17 and 24 are described in more detail in FIGS. 6 to 8.

Figure 4:
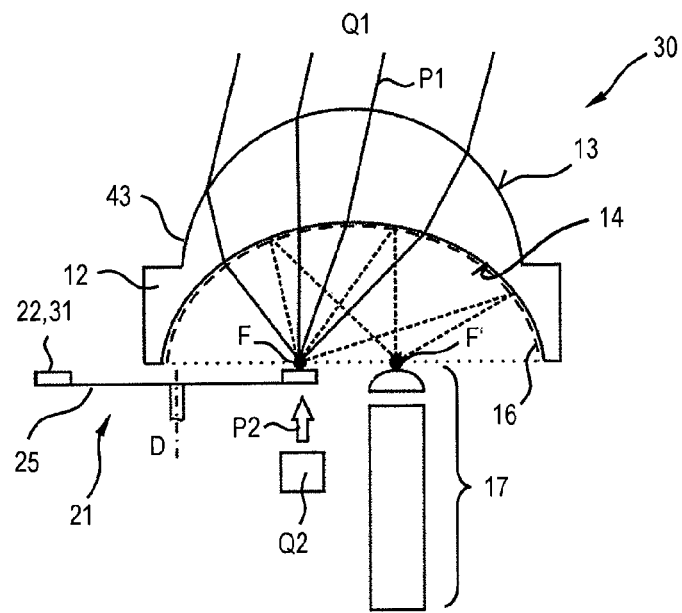
FIG. 4 shows a lighting device according to a third embodiment as a sectional representation in side view.

FIG. 4 shows a lighting device 30 according to a third embodiment as a sectional representation in side view. The lighting device 30 is constructed in a similar way to the lighting device 20, but instead of the optical unit 24 it comprises at least one second light source Q2 (in particular at least one light-emitting diode), which shines second primary light P2 of a third wavelength onto the lighting wheel 21 from the side facing away from the reflector/imaging optical element ('from below'), and specifically in the direction of the first focal point F. The third wavelength differs from the first wavelength and the wavelength-converted at least one second wavelength. In the corresponding rotational setting, the lighting wheel 21 has a region 31 which is transmissive for the second primary light P2. With at least one second light source Q2 activated or switched on, a light spot, which illuminates the reflector/imaging optical element 11, is thus generated on a side of the region 31 facing toward the reflector/imaging optical element 11. The region 31 may, in particular, be a region 31 which has the effect of scattering in the forward direction of the light beam passing through it, in order to permit simple beam expansion. The region 31 may correspond in its nature to the region 23.

The dichroic reflection layer 16 is formed so as to be reflective for the light of the third wavelength, so that the latter is reflected onto the second focal point F' and can be output further by means of the optical unit 17.

The lighting wheel 21 may thus comprise at least one luminescent material region 22 or 22a, 22b, 22c for generating wavelength-converted emission light R of the at least one second wavelength and the region 31 for providing the second primary light P2 at the second focal point F'.

In particular, the first primary light P1 may have a first wavelength of about 445 nm (which corresponds to a blue color), the second wavelengths may correspond to light of a green, yellow and/or red color, and the second primary light may have a third wavelength in a range of from about 460 nm to about 470 nm (which likewise corresponds to a blue color). In this way, a large gamut can be set up.

In another variant, a further second light source which emits light of a further third wavelength, for example red light, may be provided. For example, a beam combiner may be arranged downstream of the second light sources.

Figure 5:
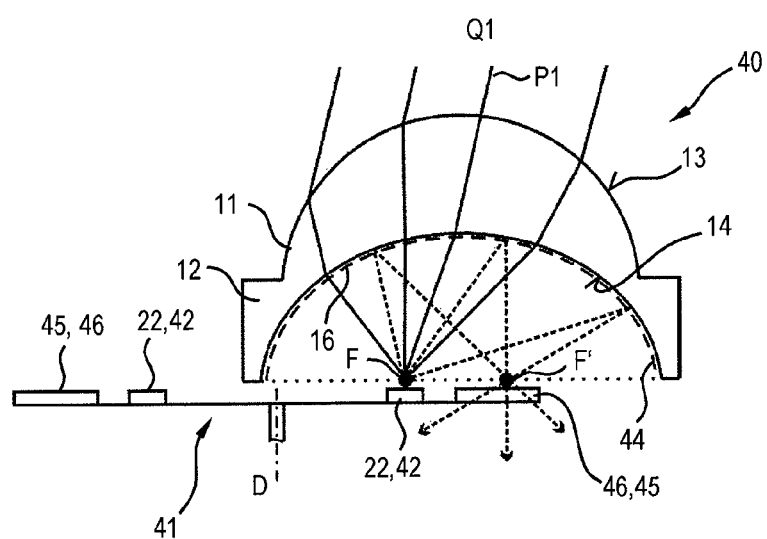
FIG. 5 shows a lighting device according to a fourth embodiment as a sectional representation in side view.

FIG. 5 shows a lighting device 40 according to a fourth embodiment as a sectional representation in side view. The lighting device 40 comprises a lighting wheel 41 which, at the first focal point F, in addition to the luminescent material region 22 or the plurality of luminescent material regions, also has a reflection region 42 which is reflective, in particular diffusely reflective, for the light P1. Consequently, in the corresponding rotational setting of the lighting wheel 41, the light P1 of the first wavelength concentrated through a reflector/imaging optical element 43 onto the first focal point F is returned into the reflector/imaging optical element 43.

In order to make it possible to use this returned light P1, the inner side 14 is covered only partially with the dichroic reflection layer 16 and partially with a fully (all wavelengths used) reflective layer 44. The two layers 16, 44 cover the inner side 14 essentially fully. In particular, the dichroic reflection layer 16 may essentially lie on a region of the inner side 14 at which the light P1 emitted by the first light source Q1 and passing through the base body 12 emerges at the inner side 14. The reflective layer 44 may lie on the surface of the inner side 14 complementary therewith. The light P1 reflected back by the reflection region 42 is thus merely transmitted through the reflector/imaging optical element 43 through the dichroic reflection (sub)layer 16, and is consequently only partially lost. On the other hand, the light P1 of the first wavelength striking the reflective (sub)layer 44 is reflected onto the second focal point F' and can be output there as useful light.

In order to prevent the light P1 of the first wavelength from also being output during a rotational setting of the lighting wheel 41 in which the luminescent material region 22, or one of the luminescent material regions, lies at the first focal point F, in addition to the wavelength-converted light R of the at least one second wavelength, a filtering optical unit 45, optically downstream of the focal point F', is arranged at or in the vicinity of the second focal point F'. This filtering optical unit 45 filters the light P1 of the first wavelength, so that after the filtering optical unit 45 this light fraction is no longer present in the useful light. The filtering optical unit 45 may, for example, be an absorption filter absorbing light P1 of the first wavelength, or alternatively a dichroic mirror reflecting the light P1 of the first wavelength.

In order to allow transmission of the light P1 in the rotational setting of the lighting wheel 41 intended therefor, in which the reflection region 42 lies at the first focal point F, the filtering optical unit 45 is then arranged on the lighting wheel 41 in such a way that it does not lie at the second focal point F'. In this rotational setting, the lighting wheel 41 may thus comprise in particular a transparent window 46 at the second focal point F' for unimpeded (loss-free) transmission of the light P1.

Only in a rotational setting in which the luminescent region 22, or one of the plurality of luminescent regions, lies at the first focal point F does the filtering optical unit 45 lie at the second focal point F'.

The lighting wheel 41 in this case therefore has a function both as a color wheel and as a filter wheel. The lighting wheel may, in particular, comprise two rings arranged concentrically around the rotation axis D, one of which (here by way of example the inner ring) comprises the luminescent material region 22 (or the plurality of luminescent material regions) and the reflection region 42 configured as ring sectors. The other ring (here by way of example the outer ring) comprises the optical filter 45 and the transparent window 46 as ring sectors.

The lighting wheel 41 may thus (by means of the filtering optical unit 45) comprise at least a part of the optical unit arranged downstream of the second focal point F, for example together with the optical unit 17.

In general, an optical unit, for example 17, 24, 45, assigned to and in particular downstream of the first focal point F and/or the second focal point F', may comprise or be an imaging optical unit, a rectifying or parallelizing optical unit, a homogenizing optical unit, a filtering optical unit and/or a transparently or translucently light-transmissive optical unit.

FIG. 6 shows a possible configuration of the optical unit 17 and/or 24, in particular for one of the lighting devices 10, 20, 30 or 40, as a sectional representation in side view.

The optical unit 17 and/or 24 may, for example, first comprise a light tunnel 51 for influencing, in particular shaping and/or homogenizing, the incident useful light N, downstream of which an imaging optical unit 52 is arranged. The light tunnel 51 may, in particular, be used for homogenization and parallel direction of the incident useful light, and may for example be provided in the form of a cylindrical light mixing rod, light guide or hollow channel. The imaging optical unit 52 may, for example, comprise one or more lenses. The optical unit 17 and/or 24 may furthermore comprise only the light tunnel 51 or only the imaging optical unit 52.

By means of the shown configuration of the optical unit 17 and/or 24, the useful light beam can be adjusted in a simple and compact way to particular aperture angles and/or to particular acceptance angle ranges, for example tuned to a downstream aperture 59.

FIG. 7 shows another possible configuration of the optical unit and/or 24 as a sectional representation in side view. Instead of the cylindrical light tunnel 51, in this case a light tunnel 53 whose light entry surface 54 is smaller than its light exit surface 55 is used. The light tunnel 53 may, for example, be provided in the form of a light mixing rod, light guide or hollow channel widening frustoconically in the light propagation direction.

FIG. 8 shows yet another possible configuration of the optical unit 17 and/or 24 as a sectional representation in side view. In this case, a plurality of lenses 57, 58 are arranged optically in series upstream of a cylindrical light tunnel 56, so that the light tunnel 56 can be configured to be relatively wide.

Of course, the present invention is not restricted to the exemplary embodiments shown.

In general, the features of the various embodiments may also be used as alternatives or in addition to one another.

In general, the wavelengths or colors (including ultraviolet and infrared) of the light sources and of the wavelength-converted light are not restricted. In particular, light may be understood as an electromagnetic wave, which includes UV light, visible light and IR light, particularly in a spectral range of between 10 nm and 1 mm.

The invention claimed is:
1. A reflector and imaging optical element comprising:
a light-transmissive base body, which is formed as a light converging lens, the base body having a concavo-convex basic shape with a concave inner side and a convex outer side; and
at least one dichroic reflector having a reflection layer, wherein the base body is configured to:
transmit light of at least one first wavelength from the outer side of the base body to and through the concave inner side of the base body, focus the light transmitted through the base body of the at least one first wavelength to a first focal point positioned within the concave inner side of the base body, and reflect light of at least one second wavelength shone from the first focal point onto the concave inner side of the base body to be directed therefrom and focused to a second focal point positioned within the concave inner side of the base body;

wherein the at least one dichroic reflector generates light of the at least one second wavelength in response to receiving the light of the at least one first wavelength; and wherein at least a portion of the at least one dichroic reflector and at least a portion of the reflection layer are positioned at the first focal point so that the light of the at least one second wavelength shines toward the concave inner side of the base body.

2. The reflector and imaging optical element of claim 1, wherein the at least one dichroic reflector is transmissive for the light of the at least one first wavelength and reflective for the light of the at least one second wavelength.

3. A lighting device having at least one reflector and imaging optical element of claim 1.

4. The reflector and imaging optical element of claim 2, wherein the base body is partially dichroically reflective and partially wavelength-independently reflective.

5. The lighting device of claim 3, further comprising:
at least one light source directed onto the outer side of the base body which generates light of the at least one first wavelength, and
at least one luminescent material region lying at least partially at or in the vicinity of the first focal point, the luminescent material region converting the light of the at least one first wavelength at least partially into the light of the at least one second wavelength.

6. The reflector and imaging optical element of claim 4, wherein the base body is dichroically reflective on at least one surface, which is provided for exit of the light of the at least one first wavelength, and is otherwise wavelength-independently reflective.

7. The lighting device of claim 5, wherein the luminescent material region is stationary relative to the first focal point.

8. The lighting device of claim 5, wherein the luminescent material region is arranged on a rotatable lighting wheel.

9. The reflector and imaging optical element of claim 6, further comprising at least one optical unit positioned downstream of the second focal point in a path of propagation of light from the second focal point.

10. The lighting device of claim 8, wherein at least a part of the rotatable lighting wheel is positioned downstream of the second focal point in a path of propagation of light from the second focal point.

11. The lighting device of claim 8, wherein the lighting wheel comprises a region that is transmissive for the light of the at least one first wavelength.

12. The lighting device of claim 8, further comprising a second light source which illuminates the rotatable lighting wheel from a side facing away from the concave inner side of the base body with light of at least one third wavelength,
wherein the concave inner side of the base body reflects the light of the at least one third wavelength, and
wherein, during rotation of the rotatable lighting wheel, the second light source shines on a region of the rotatable lighting wheel that is transmissive for the light of the at least one third wavelength.

13. The lighting device of claim 9, wherein the at least one optical unit comprises at least one of:
an imaging optical unit;
a rectifying optical unit;
a homogenizing optical unit;
a filtering optical unit; and
transparently or translucently light-transmissive optical unit.

* * * * *